(12) United States Patent
Vogt

(10) Patent No.: US 9,630,817 B2
(45) Date of Patent: Apr. 25, 2017

(54) LINEAR LINE BRAKE

(71) Applicant: Richard E Vogt, Dedham, MA (US)

(72) Inventor: Richard E Vogt, Dedham, MA (US)

(73) Assignee: Niche, Inc., New Bedford, MA (US)

( * ) Notice: Subject to any disclaimer, the term of this patent is extended or adjusted under 35 U.S.C. 154(b) by 0 days.

(21) Appl. No.: 14/538,365

(22) Filed: Nov. 11, 2014

(65) Prior Publication Data
US 2015/0158706 A1 Jun. 11, 2015

Related U.S. Application Data

(60) Provisional application No. 61/902,370, filed on Nov. 11, 2013.

(51) Int. Cl.
*F16D 63/00* (2006.01)
*B66D 5/16* (2006.01)

(52) U.S. Cl.
CPC .............. *B66D 5/16* (2013.01); *F16D 63/008* (2013.01)

(58) Field of Classification Search
CPC .... B66D 5/16; B66D 5/18; B66D 5/22; F16G 11/10; F16D 63/008; B65H 59/20; B65H 59/16
USPC ................................................ 188/61.4–61.5
See application file for complete search history.

(56) References Cited

U.S. PATENT DOCUMENTS

| | | | | |
|---|---|---|---|---|
| 2,017,625 A * | 10/1935 | Kellems | .................. | F16G 11/00 294/86.42 |
| 2,434,358 A * | 1/1948 | Frank | ...................... | B21F 15/06 174/84 S |
| 2,681,781 A * | 6/1954 | Kellems | ............... | H02G 3/0666 174/81 |
| 3,343,231 A * | 9/1967 | Clay | ......................... | F16B 7/14 24/115 |
| 4,055,875 A * | 11/1977 | Strickland | ............... | F16G 11/02 24/115 N |
| 4,354,705 A * | 10/1982 | Shorey | .................... | F16G 11/00 24/115 N |
| 4,368,910 A * | 1/1983 | Fidrych | ..................... | D07B 1/18 24/115 N |
| 4,453,291 A * | 6/1984 | Fidrych | ................ | G02B 6/4465 24/115 N |
| 5,365,715 A * | 11/1994 | Steinmetz | ............... | E04C 5/163 52/295 |
| 5,480,203 A * | 1/1996 | Favalora | ................. | B25B 25/00 24/115 N |
| 6,419,743 B1 * | 7/2002 | Stowe | ........................ | B05C 3/12 118/405 |
| 6,435,463 B1 * | 8/2002 | Zezza | ................. | A47G 33/1246 248/320 |
| 7,416,158 B2 * | 8/2008 | Sadeck | ................ | B64D 17/343 244/147 |
| 8,209,899 B2 * | 7/2012 | Klein | .................... | A01K 91/047 24/115 N |
| 8,757,594 B2 * | 6/2014 | Jordan | ................... | H02G 1/081 254/134 |

(Continued)

*Primary Examiner* — Bradley King
*Assistant Examiner* — James Hsiao

(57) ABSTRACT

A frictional rope brake that is adjustable to control the rate of descent for it given cargo weight and disengage from the cargo once the cargo has contacted its drop zone is provided. The frictional rope brake includes a braided cage, an inlet collar, an outlet tunnel, and an adjustable tensioner for adjusting frictional forces applied to the rope by the braided cage.

15 Claims, 2 Drawing Sheets

(56) References Cited

U.S. PATENT DOCUMENTS 8,997,944 B1 *   4/2015   Sadeck .................... B66D 5/16
                                                          188/65.1
9,150,368 B2 *  10/2015   Hodges .............. B65G 69/2835

* cited by examiner

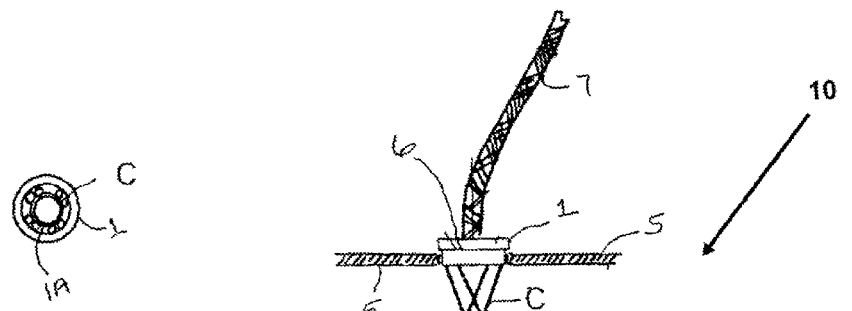
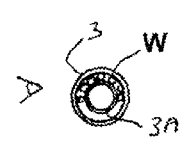
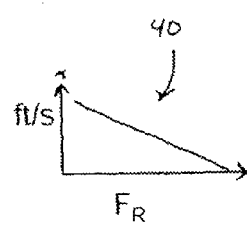
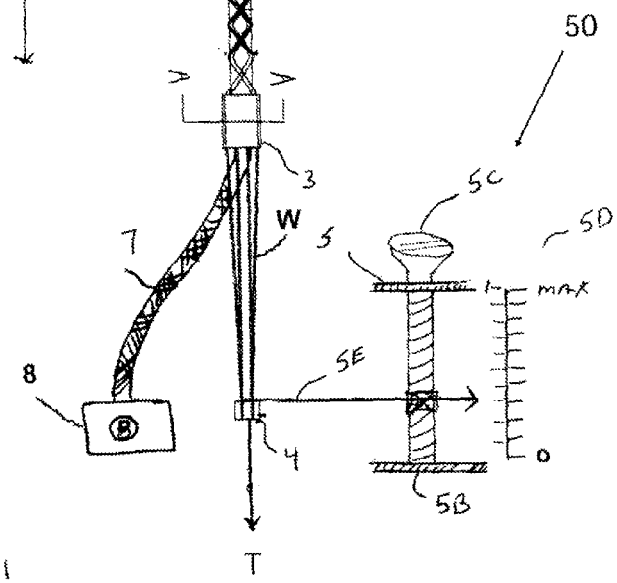
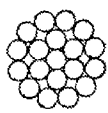
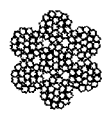

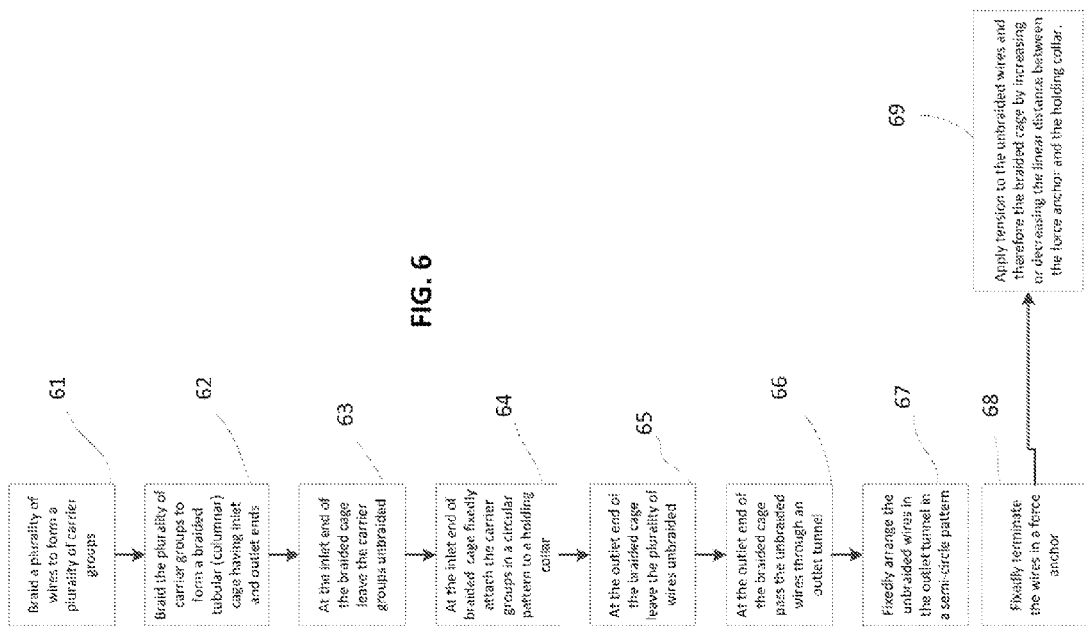

LINEAR LINE BRAKE

CROSS-REFERENCE TO RELATED APPLICATIONS

The present application is related to, claims the earliest available effective filing date(s) from (e.g., claims earliest available priority dates for other than provisional patent applications; claims benefits under 35 USC 119(e) for provisional patent applications), and incorporates by reference in its entirety all subject matter of the following listed application(s) (the, ('Related Applications") to the extent such subject matter is not inconsistent herewith; the present application also claims the earliest available effective filing dates) from, and also incorporates by reference in its entirety all subject matter of any and all parent, grandparent, great-grandparent, etc. applications of the Related Application(s) to the extent such subject matter is not inconsistent herewith:

1. U.S. provisional patent application 61902370 entitled "Linear Line Brake", naming Richard Vogt as inventor filed 11 Nov. 2013.

FIELD OF USE

The present invention relates to a cargo lowering device, more particularly a device for lower or dropping cargo at a controlled rate of descent.

DESCRIPTION OF PRIOR ART (BACKGROUND)

When dropping or lowering cargo in any gravity actuated device, there is always the possibility of the load being accelerated to the point of damaging the load upon ground impact.

Frictional brakes for use with rope, or the like, have been developed to aid the rope handler in lowering a heavy object. However the prior art frictional rope brakes fail to provide an adjustable, or controlled, rate of descent for a load of a predetermined weight. In addition, prior art frictional rope brakes also fail to disengage from the cargo once the cargo has contacted its drop zone.

Therefore, in light of the above, there is a need for a frictional rope brake that is adjustable to control the rate of descent for a given cargo weight and disengage from the cargo once the cargo has contacted its drop zone.

SUMMARY OF THE INVENTION

In accordance with one embodiment of the present invention a linear line brake for controlling the rate of descent of a rope rigged load is provided. The linear line brake includes a linear braided cage having openings disposed at either end, an outlet tunnel connected to one of the openings, and an adjustable tensioner for applying tension to the braided cage via the outlet tunnel. As tension is applied to the braided cage the diameter of the braided cage decreases; thus applying frictional force to a rope inside the braided cage. The applied frictional force may be adjusted to control the rate, or velocity, of the rope through the braided cage. Thus, the descent of a load, or cargo, attached to the rope may be controlled by controlling the frictional force applied to the rope.

In accordance with another embodiment of the invention a linear line brake for controlling the rate of cordage passing through the linear line brake is provided. The linear line brake includes a linear braided brake cage having openings disposed at either end. The brake also includes an outlet tunnel adapted to allow wires forming the braided cage to pass through and an inlet collar connected to one of the linear braided brake cage openings opposite to the outlet tunnel. The linear line brake also includes a force anchor attached to the linear line brake at an opposite end of the inlet collar. In addition the linear line brake include an adjustable tension assembly for applying tension to the braided brake cage, wherein the adjustable tension assembly is connectable to the force anchor.

The invention is also directed towards a method of construction of a tensioned braided line brake. The method includes braiding a plurality of wires to form a plurality of wire carrier groups and braiding the plurality of wire carrier groups together with a pick dimension of predetermined carrier crossings per inch so as to form a plurality of braided wire carrier groups. The plurality of braided wire carrier groups form a braided columnar cage having inlet and outlet distal ends. At one end the carrier groups are left unbraided while at the other end the plurality of wires are left unbraided. The unbraided carrier groups are fixedly termmated in an inlet collar and the unbraided wires are fixedly terminated in a force anchor. In addition, the braided line brake includes an outlet tunnel disposed between the braided cage and the force anchor. The upbraided wires are passed through the tunnel in a fixedly semi-circle before being terminated in the force anchor. Tension carried by the braided brake cage is adjusted by increasing or decreasing the linear distance between the inlet collar and the force anchor.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts:

FIG. 1 is a pictorial diagram of the linear rope brake;

FIG. 2 is a cross sectional view of the outlet tunnel of the linear rope brake shown in FIG. 1;

FIG. 3 is a cross sectional view of the inlet collar of the linear rope brake shown in FIG. 1;

FIG. 4 is a pair of notional graphs showing the linear relationship between tension force T and friction force FR applied by the linear rope brake shown in FIG. 1;

FIG. 5A is a cross sectional view of an optional 1×19 wire strand that may be used in accordance with the linear rope brake shown in FIG. 1;

FIG. 5B is a cross sectional view of an optional 7×7 wire strand that may be used in accordance with the linear rope brake shown in FIG. 1;

FIG. 5C is a cross sectional view of an optional 7×19 wire strand that may be used in accordance with the linear rope brake shown in FIG. 1; and FIG. 6 is a flow chart for one method of construction of the linear rope brake shown in FIG. 1.

DETAILED DESCRIPTION

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Referring to FIG. 1 there is shown a pictorial diagram of the rope brake 10. Rope brake 10 includes collar 1, columnar or linear braided brake cage 2, outlet tunnel 3, and force anchor 4.

Still referring to FIG. 1 Collar 1 is placed in fixture 5 with shoulder 6 of collar 1 supporting and preventing the linear rope brake 10 from moving any further through fixture 5. Rope, or cordage, 7 passes through the opening in the center of collar 1 and through braided brake cage 2, then through outlet tunnel 3 and attaches to load 8. It will be appreciated that cordage may include, for example, cable, or strapping.

In operation, or free fall from, for example, a helicopter, load 8 will pull rope 7 through braided brake cage 2. The rate rope 7 passes through braided brake cage 2 will be dependent upon circumferential frictional forces normal to the axis of the braided brake cage 2. The circumferential frictional force may be uniform around the circumference of the rope or may have a uniform gradient. For clarity, the circumferential frictional force will be described herein as forces FR1 and FR2 applied to rope 7 by braided brake cage 2. Friction forces FR1, FR2 are adjustable by adjusting force anchor 4 via tension assembly 50. Tension assembly 50 adjusts tension T applied to braided cage 2 via tension arm SE attached to force anchor 4.

It will be understood that increasing tension T reduces the diameter of braided brake cage 2 to contract around rope 7 thereby increasing friction forces FR1, FR2 on rope 7, thus controlling the rate of rope 7 through the braided brake cage 2. It will be appreciated that the frictional forces FR1, FR2 may be substantially similar for a small diameter braided cage as opposed to a larger diameter braided cage. It will also be understood the circumferential frictional force is uniform throughout the length 17 of the braided cage 2.

It will be understood that circumferential frictional forces FR1, FR2 are normal to the axis of braided brake cage 2 and are induced substantially uniformly along the entire length 7 of braided brake cage 2. It will be appreciated that in order to induce frictional forces FR1, FR2 substantially uniformly along the entire length 17, the characteristics of braided brake cage 2 are substantially uniform along the length 17 of the braided brake cage 2. For example the pick dimension P, or Picks per inch—is the number of carrier crossing points per longitudinal inch of length 17. Pick dimension P may be any suitable pick dimension, such as, for example, 2 carrier crossings per inch.

Still referring to FIG. 1 braided brake cage 2 may be comprised of any suitable number of carriers C, the number of groups of individual braid wires, such as for example 8 braid wire groups. Each of the braid wire groups C may comprise any suitable number of individual wires W (FIG. 3) and each of the individual wires W may comprise any suitable number of strands (See FIG. 5).

Referring also to FIG. 2, there is shown a cross section view of outlet tunnel 3. Outlet tunnel 3 includes inner ferrule 3A pressure fitted to hold individual wires W. As shown in FIG. 2, individual wires W are disposed substantially in a semi-circle around inner ferrule 3A to allow rope 7 to exit outlet tunnel 3.

Referring also to FIG. 3 there is shown a cross section view of collar 1. Collar 1 includes pressure fitted inner ferrule 1A for holding carder groups C in groups of 2. As noted earlier, carrier groups C may be any suitable number of groups. Carder groups C are disposed substantially equidistant around inner ferrule 1A.

Referring to FIG. 4 there is shown a pair of notional graphs showing the linear relationship between tension force T and friction forces FR1, FR2. As tension T is increased (or decreased) by tension adjustor 5C friction forces FR1, FR2 are, substantially, directly proportional. As circumferential friction forces FR1, FR2 are increased (or decreased) the rate ft./s at which the rope passes through braided brake cage 2 is, substantially, inversely proportional. For example, if tension adjustor 5C is adjusted to increase tension T between surfaces 5 and 5B circumferential friction forces FR1, FR2 are also increased and the rate at which the rope passes through braided brake cage 2 is decreased (see notional rate scale FIG. 1, item 51).

If tension force T is sufficiently large, the resultant frictional forces FR1, FR2 will increase the braided brake cage 2 frictional forces FR1, FR2 to prevent the rope from moving through the braided brake cage 2. It will be appreciated that this demonstrates a full braking feature of the present invention. Effective braking for a range of loads 8 is directly proportional to the induced frictional forces FR1, FR2 and therefore directly proportional to the length 17 of the braided brake cage 2. It will be appreciated that any suitable length 17, such as, for example, 4.25 inches, may be used.

Referring also to FIG. 5A, each of the individual wires 3B may be any suitable wire strand such as a stainless steel wire strand construction 1×19. It will be understood that any suitable wire strand constructions may be used, such as, for example, 7×7 (FIG. 5B), or 7×19 (FIG. 5C). It will be appreciated that the wire strands may be coated or galvanized or otherwise coated wire strands. For example the wire strands may be TEFLON coated. In addition, the wire strands may be wound in any suitable winding arrangement, such as, for example, regular lay, Lang, lay, right lay, left lay, or alternate lay.

Referring also to FIG. 6 there is shown a method flow chart for one method of constructing the linear rope brake shown in FIG. 1. It will be appreciated that while the method is described in a particular order for clarity the order of the steps may be any suitable order. Step 61 contemplates braiding a plurality of wires to form carrier groups. Step 62 braids the carrier groups to form a columnar braided cage. Stated differently the braided cage is tubular in shape. Step 63 contemplates leaving some length of the carrier groups at the inlet end of the braided tubular cage unbraided. These unbraided carrier group ends are fixedly attached to a holding collar in a circular pattern, step 64. At the other end of the braided tubular cage step 65 contemplates leaving some length of the wires unbraided. These unbraided wires are passed through an outlet tunnel, step 66, and fixedly arranged in the outlet tunnel in a semi-circle around the outlet tunnel, step 67. It will be appreciated that the wires arranged in a semi-circle around the outlet tunnel allow for a line or rope through the braided tunnel to exit the braking device (see FIG. 1). It will also be appreciated that the wires may be arranged around the tunnel in any suitable pattern to allow a rope or line to exit the braking device. It will also be appreciated that wires may be fixedly arranged in the outlet tunnel or allowed to "float" and assume a pattern induced by the rope or line exiting the tunnel. Step 68 terminates the wires in a force anchor. Step 69 applies tension to the wires and therefore the tubular cage by linear separation of the force anchor and the holding collar. It will be appreciated that tension applied to the tubular cage acts to decrease the circumference of the tubular cage and therefore increases the frictional force acting upon a rope or line within the tubular cage.

The versions of the present invention described above are intended to be merely exemplary and those skilled in the art shall be able to make numerous variations and modifications to it without departing from the spirit of the present invention. All such variations and modifications are intended to be within the scope of the present invention as defined in the appended claims. For example, tension T may be preset to a fixed tension by a removable tension assembly 50.

What is claimed is:

1. A linear line brake for controlling the rate of cordage passing through the linear line brake, the linear line brake comprising:
    a linear braided brake cage having openings disposed at either end;
    an outlet tunnel connected to one of the linear braided brake cage openings wherein the outlet tunnel comprises an outer outlet tunnel collar; an inner tunnel collar ferrule; and a plurality of unbraided wires disposed between the outer outlet tunnel collar and the inner tunnel collar ferrule in a semi-circle around the inner tunnel collar ferrule;
    a collar connected to one of the linear braided brake cage openings opposite to the outlet tunnel;
    a force anchor; and
    an adjustable tensioner assembly for applying tension to the braided brake cage, wherein the adjustable tensioner assembly is connectable to the force anchor.

2. The linear line brake as in claim 1 wherein the linear braided cage comprises a plurality of braid wire groups having distal ends.

3. The linear line brake as in claim 2 wherein one of the distal ends of the braid wire groups comprises a plurality of braided wires and the other distal end comprises the plurality of braided wires unbraided.

4. The linear line brake as in claim 3 wherein the plurality of unbraided wires are fixedly attached to the force anchor.

5. The linear line brake as in claim 3 wherein e collar comprises:
    an outer collar;
    an inner collar ferrule; and
    the plurality of braided wires fixedly disposed between the outer collar and the inner collar ferrule in a circle around the inner collar ferrule.

6. The linear line brake as in claim 1 wherein the adjustable tension assembly comprises:
    a tension arm, wherein the tension arm is connectable to the force anchor; and
    a tension adjuster connectable to the tension arm.

7. A linear line brake for controlling the rate of cordage passing through the linear line brake, the linear line brake comprising:
    a columnar braided brake cage having openings disposed at either end, wherein one end of the columnar braided brake cage comprises:
        a plurality of wire groups, wherein each of the plurality of wire groups comprise:
            a plurality of braided wires;
        wherein the other end of the columnar braided brake cage comprises the plurality of wires unbraided;
    an outlet tunnel connected to one of the linear braided brake cage openings, wherein the outlet tunnel comprises:
        an outer outlet tunnel collar;
        an inner outlet tunnel ferrule; and
        wherein the plurality of wires are rigidly disposed between the outer outlet tunnel collar and the inner outlet tunnel ferrule in a semi-circle around the inner outlet tunnel ferrule;
    a collar connectable to one of the linear braided brake cage openings opposite to the outlet tunnel wherein the collar comprises:
        an outer collar;
        an inner collar ferrule, the plurality of wire groups fixedly disposed between the outer collar and the inner collar ferrule in a circle around the inner collar ferrule;
    a force anchor;
    an adjustable tension assembly for applying tension to the braided brake cage, wherein the adjustable tensioner is connectable to the force anchor, wherein the adjustable tension assembly comprises:
        a tension arm, wherein the tension arm is connectable to the force anchor; and
        a tension adjuster adapted to adjust the tension arm.

8. The linear line brake as in claim 7 wherein each of the plurality of braided wires comprise a plurality of wire strands.

9. The linear line brake as in claim 7 wherein each of the plurality of wire strands comprises a stainless steel wire strand.

10. The linear line brake as in claim 7 wherein each of the plurality of wire strands comprises a galvanized wire strand.

11. The linear line brake as in claim 7 wherein each of the plurality of wire strands comprise a coated wire strand.

12. A method of construction of a tensioned braided line brake, the method comprising:
    braiding a plurality of wires to form a plurality of wire carrier groups;
    braiding the plurality of wire carrier groups together with a pick dimension of predetermined carrier crossings per inch so as to form a plurality of braided wire carrier groups, wherein the plurality of braided wire carrier groups form a braided columnar cage having inlet and outlet distal ends, wherein the inlet distal end comprises the plurality of wire carrier groups and the outlet distal end comprises the plurality of wires;
    fixedly terminating the inlet end carrier groups in an inlet collar; providing an outlet tunnel disposed between the braided columnar brake cage and the force anchor; wherein the outlet tunnel comprises an outer outlet tunnel collar; an inner tunnel collar ferrule; and a plurality of unbraided wires disposed between the outer outlet tunnel collar and the inner tunnel collar ferrule in a semi-circle around the inner tunnel collar ferrule;
    fixedly terminating the outlet end wires in a force anchor; and
    adjusting the tension carried by the tensioned line brake.

13. The method as in claim 12 wherein braiding the plurality of wire carrier groups together with a pick dimension of predetermined carrier crossings per inch further comprises braiding the plurality of wire carrier groups together with a pick dimension of substantially two carrier crossings per inch.

14. The method as in claim 12 wherein fixedly terminating the inlet end carrier groups in the inlet collar further comprises fixedly terminating the inlet carrier groups in a circular pattern in the inlet collar.

15. The method as in claim 12 wherein adjusting the tension carried by the line brake further comprises:
provide a tension arm connectable to the force anchor; and
providing a tension adjustor connectable to the tension arm.

* * * * *